United States Patent
Hatsuzawa et al.

(10) Patent No.: US 10,767,544 B2
(45) Date of Patent: Sep. 8, 2020

(54) VALVE BODY, ELECTRONIC CONTROL THROTTLE BODY, MOTOR-DRIVEN THROTTLE BODY, AND VALVE DEVICE

(71) Applicant: Hitachi Automotive Systems, Ltd., Hitachinaka-shi, Ibaraki (JP)

(72) Inventors: Hidefumi Hatsuzawa, Hitachinaka (JP); Makoto Kawano, Hitachinaka (JP); Toshio Hori, Hitachinaka (JP); Toyoshi Nemoto, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 79 days.

(21) Appl. No.: 16/088,460

(22) PCT Filed: Mar. 24, 2017

(86) PCT No.: PCT/JP2017/011905
§ 371 (c)(1),
(2) Date: Sep. 26, 2018

(87) PCT Pub. No.: WO2017/179392
PCT Pub. Date: Oct. 19, 2017

(65) Prior Publication Data
US 2019/0107034 A1 Apr. 11, 2019

(30) Foreign Application Priority Data
Apr. 12, 2016 (JP) ................. 2016-079249

(51) Int. Cl.
*F01P 3/00* (2006.01)
*F01P 3/14* (2006.01)
(Continued)

(52) U.S. Cl.
CPC .............. *F01P 3/14* (2013.01); *F02D 9/10* (2013.01); *F02D 9/1035* (2013.01); *F02D 11/10* (2013.01);
(Continued)

(58) Field of Classification Search
CPC ......... F01P 2060/02; F01P 3/14; F02D 11/10; F02D 2011/102; F02D 9/10;
(Continued)

(56) References Cited

U.S. PATENT DOCUMENTS 2,715,520 A * 8/1955 Boyce ............... F02M 15/022
261/130
4,401,090 A * 8/1983 Fujimoto ........... F02M 15/022
123/545
(Continued)

FOREIGN PATENT DOCUMENTS

| EP | 1 420 158 B1 | 1/2011 |
|---|---|---|
| JP | 9-209852 A | 8/1997 |

(Continued)

OTHER PUBLICATIONS

JP 09209852 English translation (Year: 1997).*
(Continued)

*Primary Examiner* — George C Jin
*Assistant Examiner* — Teuta B Holbrook
(74) *Attorney, Agent, or Firm* — Crowell & Moring LLP

(57) ABSTRACT

An object is to provide a type of device capable of properly cooling a bearing of a throttle body even under a condition that the throttle body receives heat of high-temperature intake air or exhaust gas. In the present invention, an engine coolant passage that guides a coolant of an engine is provided integrally with a member fixing a bearing to be adjacent to a circumferential wall of the bearing of the member fixing the bearing, which supports a throttle shaft, (Continued)

and heat transferred from the bearing (or likely to be transferred to the bearing) via the member fixing the bearing is carried away to the outside of a throttle body by the engine coolant.

14 Claims, 8 Drawing Sheets

(51) Int. Cl.
　　*F16K 1/22*　　　(2006.01)
　　*F02D 9/10*　　　(2006.01)
　　*F02M 26/70*　　　(2016.01)
　　*F02M 26/73*　　　(2016.01)
　　*F02D 11/10*　　　(2006.01)
　　*F16C 37/00*　　　(2006.01)

(52) U.S. Cl.
　　CPC ............ *F02M 26/70* (2016.02); *F02M 26/73* (2016.02); *F16C 37/007* (2013.01); *F16K 1/22* (2013.01); *F01P 2060/02* (2013.01); *F02D 2011/102* (2013.01); *F16C 2361/91* (2013.01)

(58) Field of Classification Search
　　CPC ...... F02D 9/1035; F02M 26/70; F02M 26/73; F16C 2361/91; F16C 37/007; F16K 1/22
　　See application file for complete search history.

(56) References Cited

U.S. PATENT DOCUMENTS

| | | | | |
|---|---|---|---|---|
| 4,527,423 A | * | 7/1985 | Sato ........................... | G01F 1/68 73/114.32 |
| 4,546,748 A | * | 10/1985 | Karino .................. | F02D 41/187 123/494 |
| 4,805,564 A | * | 2/1989 | Hudson, Jr. ...... | F02M 35/10118 123/184.42 |
| 5,094,212 A | * | 3/1992 | Kawaguchi ............ | F02M 51/02 123/41.31 |
| 5,970,960 A | * | 10/1999 | Azuma ............ | F02M 35/10222 123/568.12 |
| 6,516,776 B1 | | 2/2003 | Kai et al. | |
| 2001/0013332 A1 | * | 8/2001 | Torii ...................... | F02M 15/02 123/337 |
| 2002/0104511 A1 | * | 8/2002 | Torii ....................... | F02D 9/104 123/399 |
| 2012/0180452 A1 | * | 7/2012 | Caine ..................... | B60H 1/025 60/273 |
| 2012/0313025 A1 | * | 12/2012 | Takai .................. | F16K 27/0218 251/313 |
| 2013/0180507 A1 | * | 7/2013 | Nakasugi ............ | F02B 29/0437 123/542 |
| 2015/0337850 A1 | * | 11/2015 | An ........................ | F04D 25/024 60/605.3 |
| 2016/0069319 A1 | * | 3/2016 | Shiraishi ................ | F02P 5/152 123/625 |
| 2016/0252190 A1 | * | 9/2016 | Baasch ................. | F16K 49/005 137/340 |

FOREIGN PATENT DOCUMENTS

| | | | | |
|---|---|---|---|---|
| JP | 09209852 A | * | 8/1997 | ............. F02M 31/10 |
| JP | 2001-123855 A | | 5/2001 | |
| JP | 2001123855 A | * | 5/2001 | ....... F02M 35/10268 |
| JP | 2001-303982 A | | 10/2001 | |
| JP | 2004-162665 A | | 6/2004 | |
| JP | 2013-147954 A | | 8/2013 | |
| JP | 2013147954 A | * | 8/2013 | |
| WO | WO 02/16750 A1 | * | 2/2002 | ............. F02M 25/07 |

OTHER PUBLICATIONS

JP 2001123855 A Englsih translation (Year: 2001).*
Japanese-language Office Action issued in counterpart Japanese Application No. 2018-511949 dated Apr. 16, 2019 with English translation (10 pages).
International Search Report (PCT/ISA/210) issued in PCT Application No. PCT/JP2017/011905 dated Jun. 27, 2017 with English translation (four pages).
Japanese-language Written Opinion (PCT/ISA/237) issued in PCT Application No. PCT/JP2017/011905 dated Jun. 27, 2017 (five pages).

* cited by examiner

5F1          5F2

VALVE BODY, ELECTRONIC CONTROL THROTTLE BODY, MOTOR-DRIVEN THROTTLE BODY, AND VALVE DEVICE

TECHNICAL FIELD

The present invention relates to a valve body, an electronic control throttle body, a motor-driven throttle body, and a valve device which adjust a flow rate of a fluid in an internal combustion engine. For example, the present invention is particularly attached to an intake passage of the internal combustion engine and variably controls a passage cross-sectional area of the intake passage to be used in a gasoline engine vehicle so as to adjust the amount of air sucked into a cylinder or in a diesel engine so as to control pressure in an intake pipe.

Incidentally, in the gasoline engine vehicle, the present invention is used in either a so-called in-cylinder direct fuel injection engine in which fuel is directly injected into a cylinder or a so-called port injection engine in which fuel is injected into an intake pipe.

BACKGROUND ART

Especially, intake air is pressurized by a turbocharger so that the intake air temperature rises in an engine equipped with the turbocharger, and thus, an intercooler is provided downstream of the turbocharger to cool the intake air whose temperature has risen.

In this case, when the intercooler is positioned downstream of a throttle body, the high-temperature intake air before being cooled passes through the throttle body, and thus, there is a problem that heat resistance of a bearing of the throttle body is insufficient. For example, as described in JP 2013-147954 A, there is a known technique in which a spacer member having an internal passage for circulation of an engine coolant is sandwiched between a throttle body and an intercooler to dissipate heat of a bearing to an engine coolant passage such that the bearing does not become a temperature of the engine coolant passage or higher.

CITATION LIST

Patent Literature

PTL 1: JP 2013-147954 A

SUMMARY OF INVENTION

Technical Problem

However, with this conventional configuration, there is a problem that it is difficult to sufficiently transfer the heat transmitted to a bearing of the throttle body to the coolant so that it is necessary to change to a bearing corresponding to heat-resistant specification. In addition, there is a problem that it is difficult to secure a bearing press-fitting and fastening margin at a high temperature due to a difference in linear expansion coefficient so that it becomes necessary to adopt a holding method other than press-fitting.

In addition, if a coolant flow path is disposed as a separate member at a bearing cooling position as in the above-described known example, there is a problem that the throttle body is increased in size.

In addition, the same problem may occur in a diesel engine having a so-called EGR device for recirculation of an exhaust gas to an intake passage because a throttle body receives heat of the exhaust gas.

An object of the present invention is to provide a type of device capable of properly cooling a bearing of a throttle body even under a condition that the throttle body receives heat of high-temperature intake air or exhaust gas as described above, and is configured to solve at least one of the above problems.

Solution to Problem

In order to achieve the above object, according to the present invention, an engine coolant passage that guides a coolant of an engine is provided integrally with a member fixing a bearing to be adjacent to a circumferential wall of the bearing of the member fixing the bearing, which supports a throttle shaft, and heat transferred from the bearing (or likely to be transferred to the bearing) via the member fixing the bearing is carried away to the outside of a throttle body by the engine coolant.

According to an embodiment to be described later, specifically, an outer wall is integrally formed on at least a part of an outer side of an inner wall of the intake passage through which intake air passes, an inlet pipe for guiding the engine coolant to a space formed between the inner wall and the outer wall and an outlet pipe for discharging the engine coolant heated from the space communicate each other, and the space is integrally formed so as to be capable of transferring the heat around a pair of bearings of the throttle shaft extending through the intake passage.

More specifically, the inlet pipe and the outlet pipe are positioned between the pair of bearings, and a passage cross-sectional area of a space from positions of the inlet pipe and the outlet pipe to the periphery of the bearing is formed to be larger than a passage cross-sectional area of a space of a portion close to the bearing. As a result, a passage cross-sectional shape of the space from the positions of the inlet pipe and the outlet pipe to the periphery of the bearing is a cross-sectional shape that is different from the passage cross-sectional shape of the space of the portion close to the bearing.

More specifically, the space is formed in an attachment end face of the member fixing the bearing as an arcuate groove which is released in a flowing direction of air.

More preferably, the arcuate groove is formed as an annular groove which turns full circle around the intake passage.

More preferably, the inlet pipe and the outlet pipe are adjacent to each other with a partition wall partitioning the annular groove sandwiched therebetween.

More preferably, the inlet pipe is provided on a side of a cover of the throttle body, and the outlet pipe is positioned on a side opposite to the cover.

More preferably, the space around the bearing on the side of the cover of the throttle body is formed to be shallow in the flowing direction of the intake air, and as a result, a space for disposing a spring is secured between the space and an outer circumference of the bearing.

Advantageous Effects of Invention

According to the present invention configured as described above, it is possible to properly cool the bearing of the throttle body since the heat can be transferred smoothly from the bearing to the engine coolant even under the condition that the throttle body receives the heat of the high-temperature intake air or exhaust gas.

Specific effects of an embodiment will be described in detail in the following description of the embodiment.

DESCRIPTION OF EMBODIMENTS

Embodiments of the present invention will be described with reference to the drawings.

First Embodiment

An embodiment of a rotation angle detection device according to the present invention will be described with reference to FIGS. 1 to 5.

Figure 1:
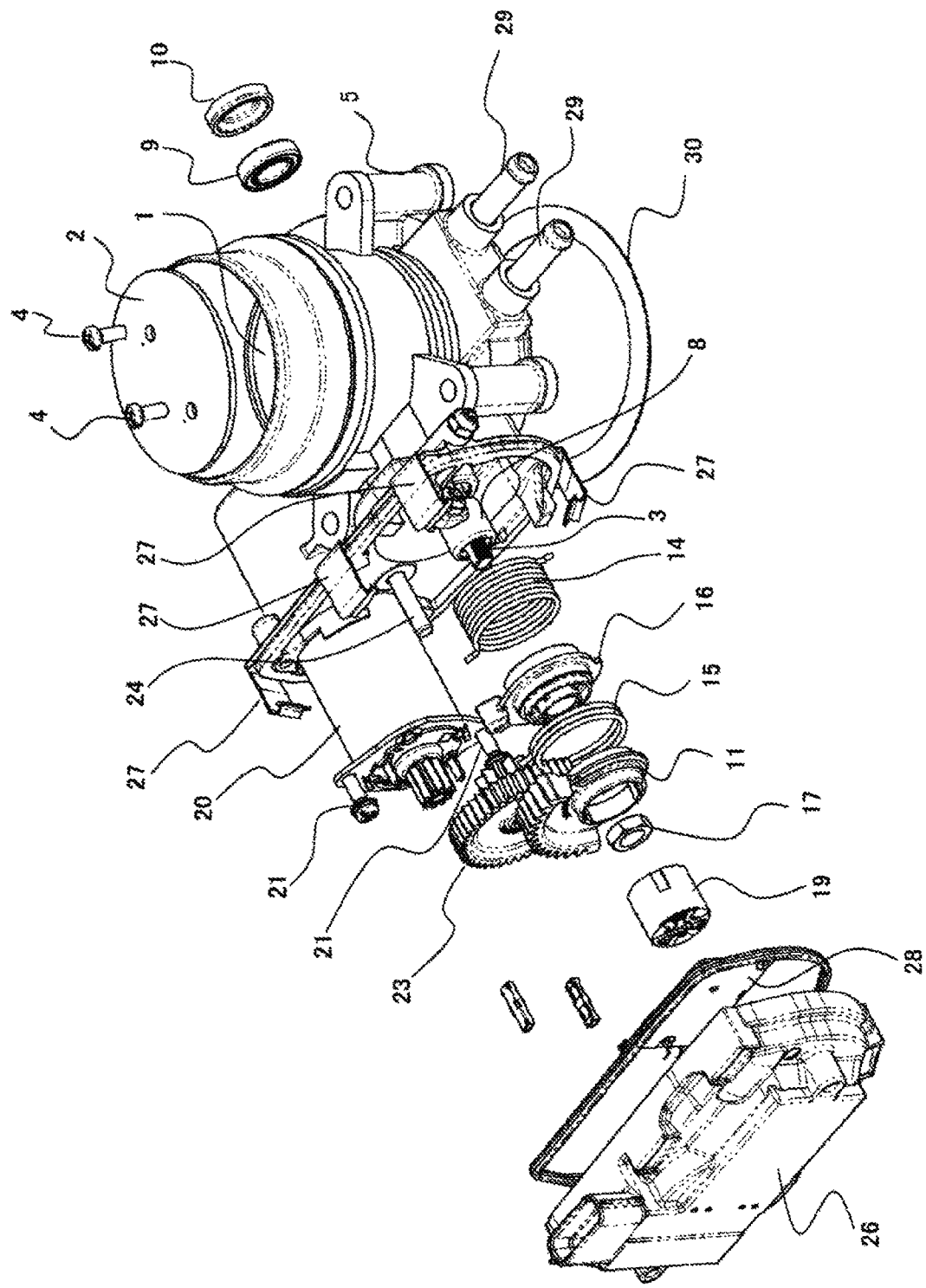
FIG. 1 is an exploded perspective view of a motor-driven throttle valve control device used for a gasoline engine vehicle.

As illustrated in FIG. 1, a throttle body 5 forms a bore 1. As illustrated in FIG. 3, grooves 5T1 to 5T4 are disposed so as to surround the entire circumference of the bore 1 in the throttle body 5. The grooves 5T1 to 5T4 and a plate 30 (see FIGS. 1 and 2) form a coolant passage. Here, the inlet-side coolant pipe 29A and the outlet-side coolant pipe 29B, which are connected to the throttle body 5 by press-fitting, are connected to the coolant passage and serve as interfaces with counterpart hoses.

Figure 2:
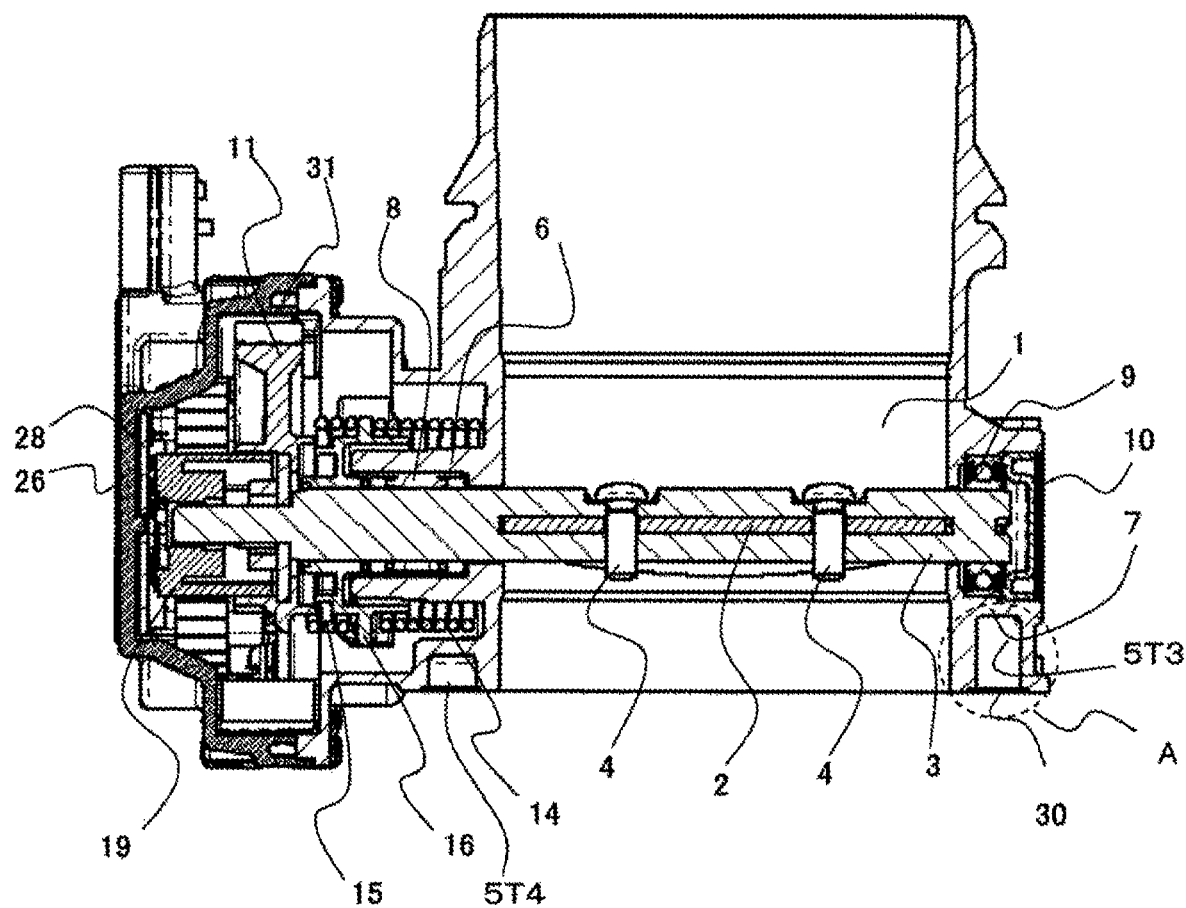
FIG. 2 is a cross-sectional view of the motor-driven throttle valve control device used for the gasoline engine vehicle.
Figure 3:
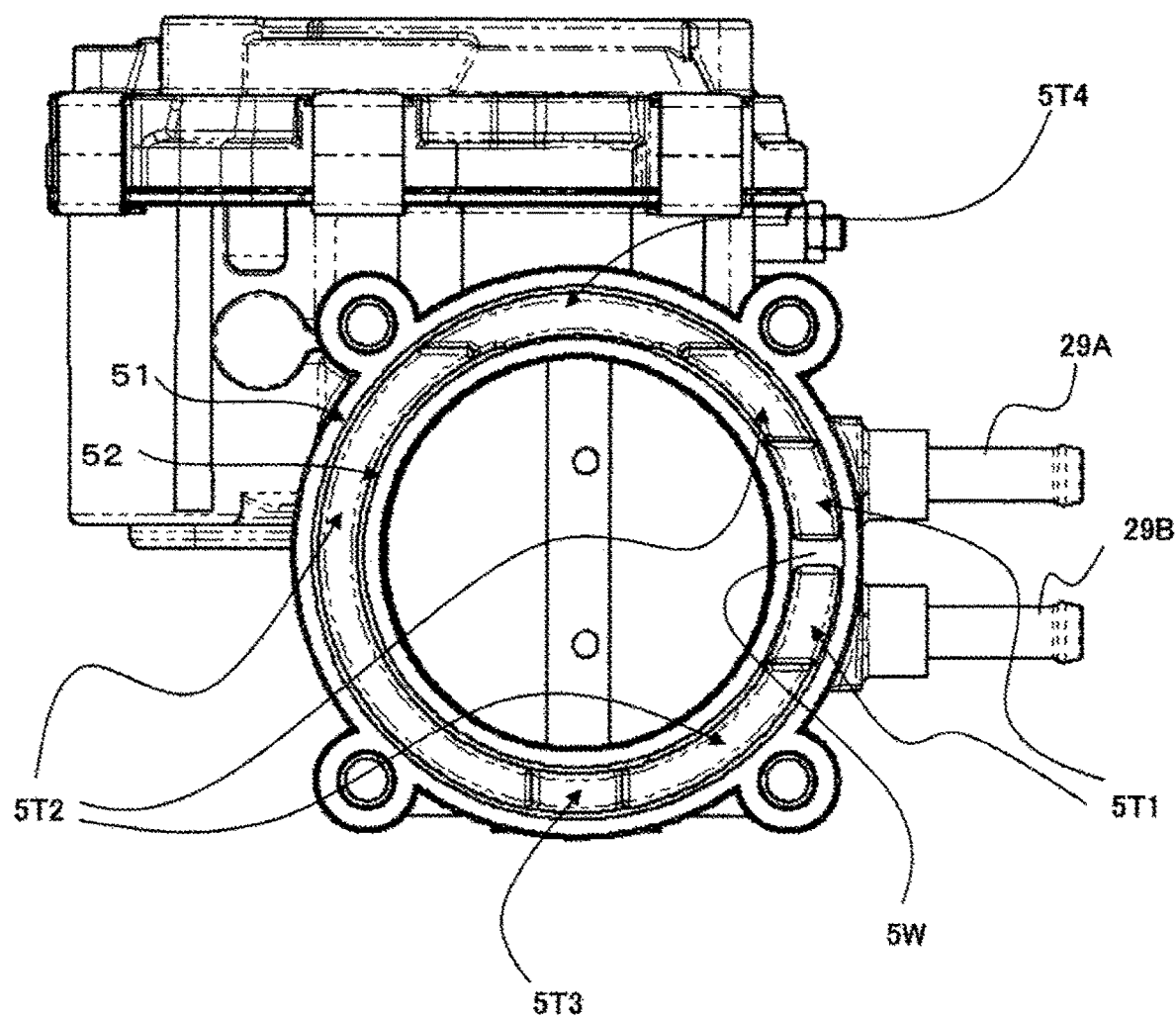
FIG. 3 is a plan view of the motor-driven throttle valve control device used for the gasoline engine vehicle from which a plate has been removed.
Figure 4:
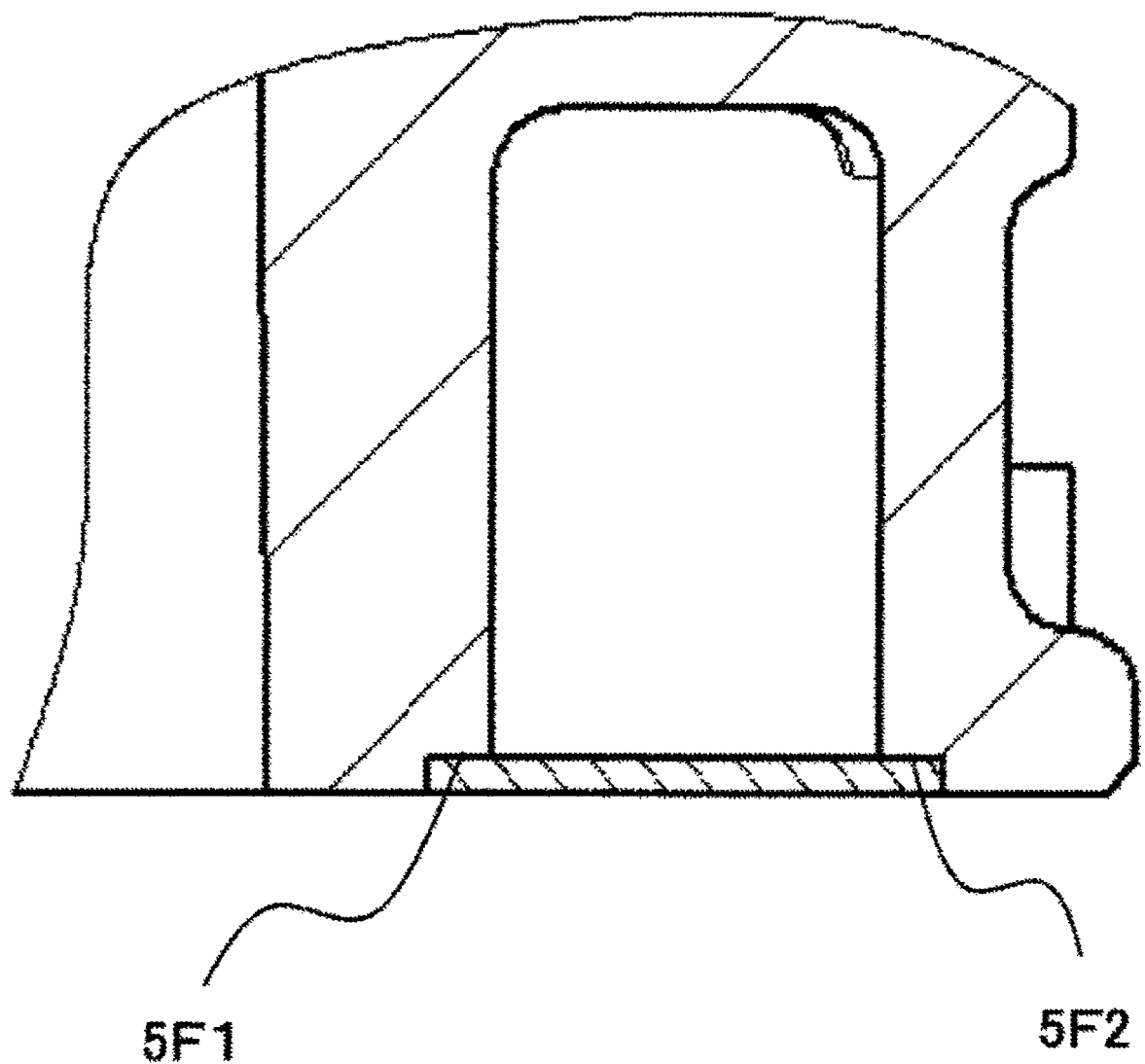
FIG. 4 is a cross-sectional view of a coolant passage surrounded by a dotted line in FIG. 2.

FIG. 4 is a cross-sectional view of the coolant passage surrounded by a dotted line in FIG. 2. Plate attachment portions 5F1 and 5F2 having a width larger than a groove width are provided at ends of the grooves 5T1 to 5T4 of the throttle body 5. The plate attachment portions 5F1 and 5F2 serve as pedestals at the time of attaching the plate 30. After being disposed on the pedestal, the plate 30 is joined to the throttle body 5 by, for example, friction stir welding (FSW) to form a hot water passage having secured airtightness.

Figure 5:
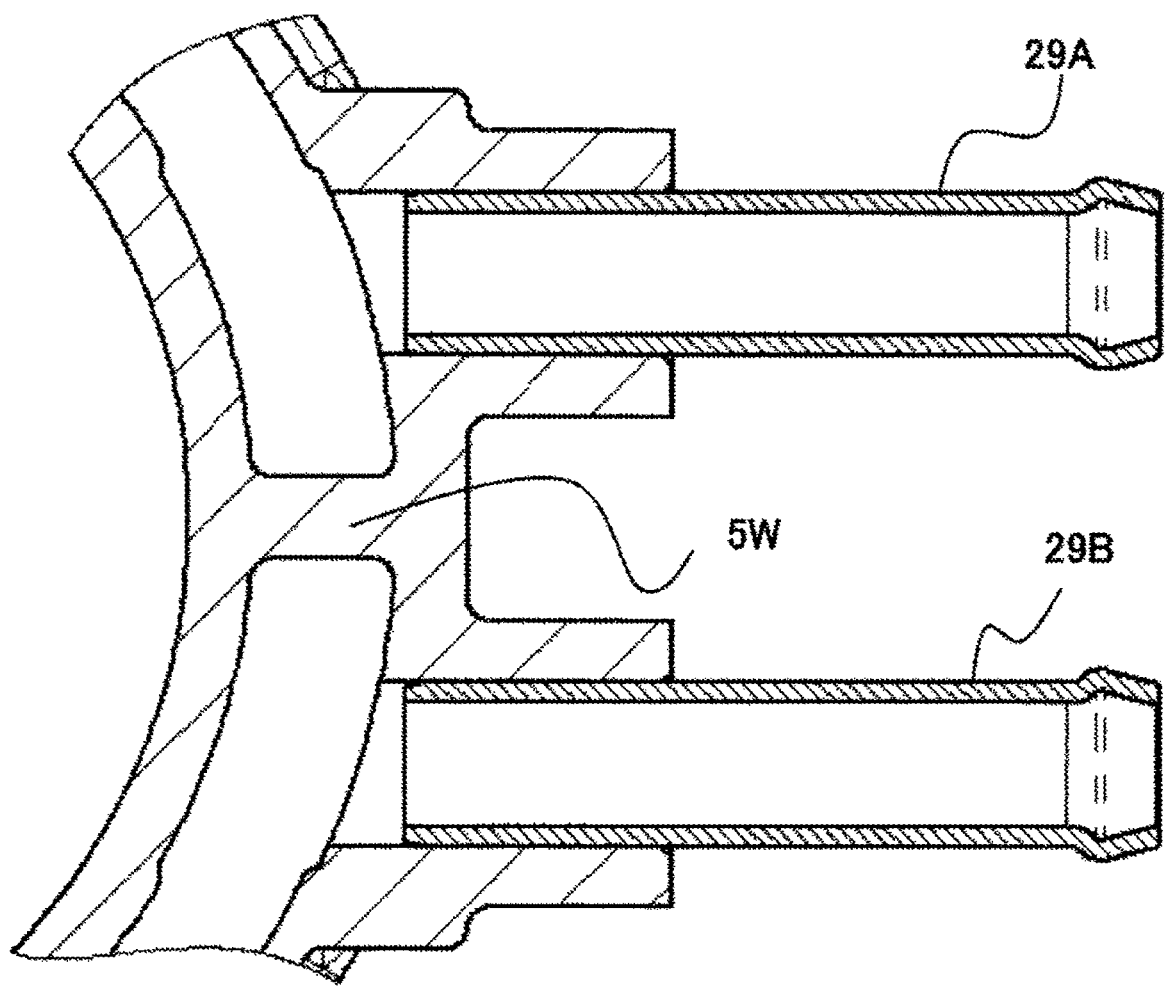
FIG. 5 is a cross-sectional view of a coolant pipe coupling portion.

As illustrated in FIGS. 3 and 5, a wall portion 5W is disposed in a groove between the inlet-side coolant pipe 29A and the outlet-side coolant pipe 29B. The wall portion 5W prevents the coolant from directly flowing from the inlet-side coolant pipe 29A to the outlet-side coolant pipe 29B without passing through the vicinity of a shaft hole.

As illustrated in FIGS. 2 and 3, the groove 5T4 of the coolant passage in the vicinity of a bearing 8 is shallower than other portions in order to secure a space for disposing a return spring 14. In addition, the groove 5T1 of the coolant passage is deeper than other portions in order for connection from the coolant pipe to the coolant passage. The coolant passage 5T3 in the vicinity of a bearing 9 is shallower than the coolant passage 5T2 in order to secure a space for disposing the bearing 9. Here, a relation among the depths of the respective grooves 5T1 to 5T4 is set such that 5T1>5T2>5T3>5T4.

As the coolant passage is disposed while changing a cross-sectional shape thereof in this manner, it is possible to form a throttle valve control device which is compact and excellent in heat resistance by avoiding an excessively increase of a size of the throttle valve control device.

Next, an example in which the above coolant passage is applied to a motor-driven throttle valve (throttle valve) control device for a gasoline engine will be specifically described with reference to FIGS. 1 and 6 to 8. Hereinafter, a configuration of the motor-driven throttle valve control device will be described.

Figure 8:
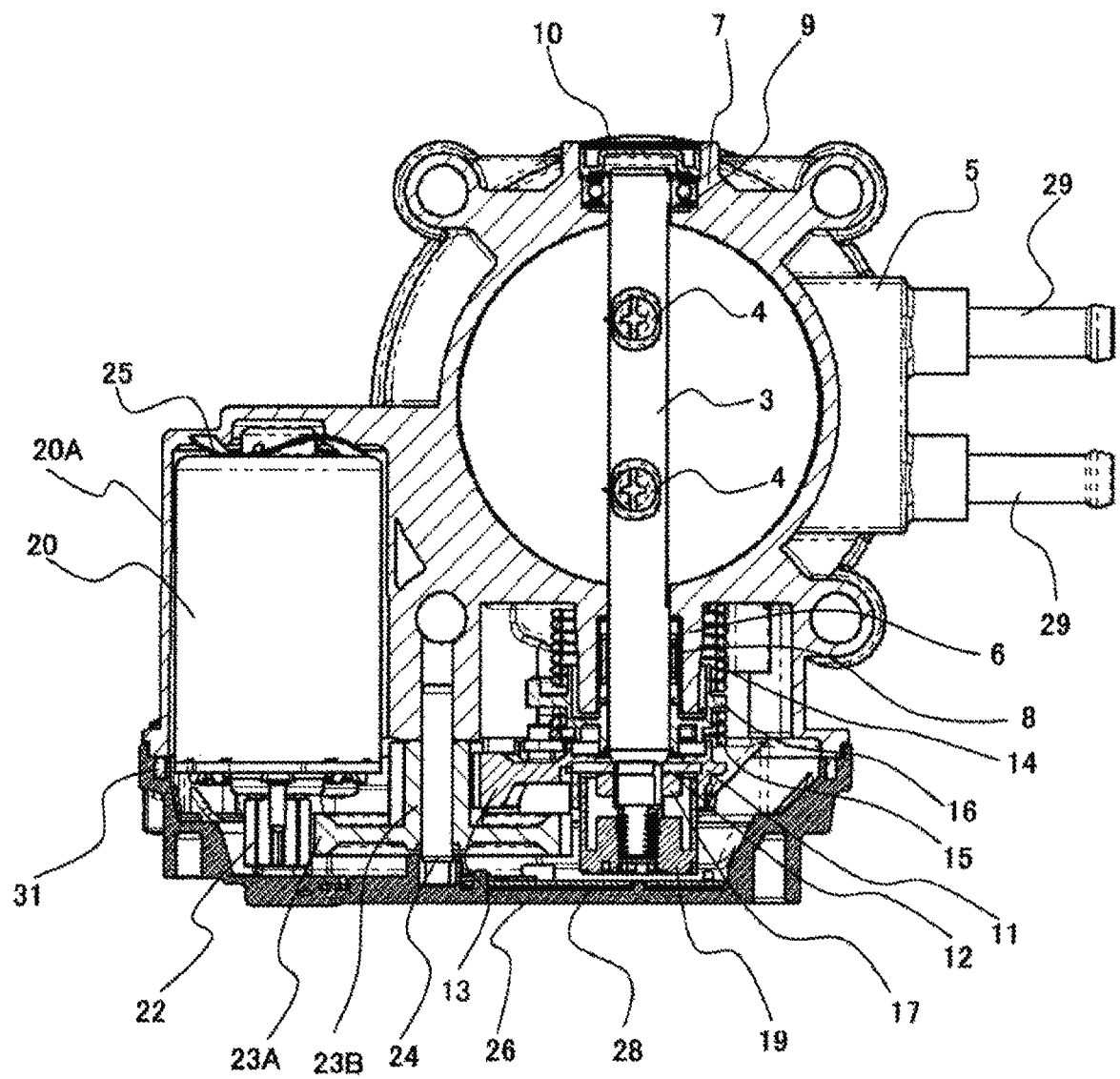
FIG. 8 is a cross-sectional view of the motor-driven throttle valve control device used for the gasoline engine vehicle.

As illustrated in FIG. 8, an aluminum die-cast throttle valve assembly 5 (hereinafter referred to as the "throttle body") is integrally molded with an intake passage 1 (hereinafter referred to as the bore) and a motor housing 20A configured to house a motor 20.

A metallic rotating shaft (hereinafter referred to as a "throttle shaft") 3 is disposed on the throttle body 5 along one diameter line of the bore 1. Both ends of the throttle shaft 3 are rotatably supported by needle bearings as the bearings 8 and 9. The bearings 8 and 9 are press-fitted and fixed to bearing bosses 6 and 7 provided in the throttle body 5.

In addition, the bearing 9 is press-fitted into the throttle body 5 after being press-fitted into the throttle shaft 3. Thereafter, the movable amount of the throttle shaft 3 in an axial direction is regulated by being pressed by a cap press-fitted into the throttle body 5. Thus, the throttle shaft 3 is rotatably supported with respect to the throttle body 5.

On the throttle shaft 3, a throttle valve (hereinafter referred to as a throttle valve) 2, configured using a disc made of a metal material, is inserted into a slit provided in the throttle shaft 3, and is fixed to the throttle shaft 3 with a screw 4. Thus, when the throttle shaft 3 rotates, the throttle valve 2 rotates, and as a result, a cross-sectional area of the intake passage changes, and a flow rate of intake air to the engine is controlled.

Figure 6:
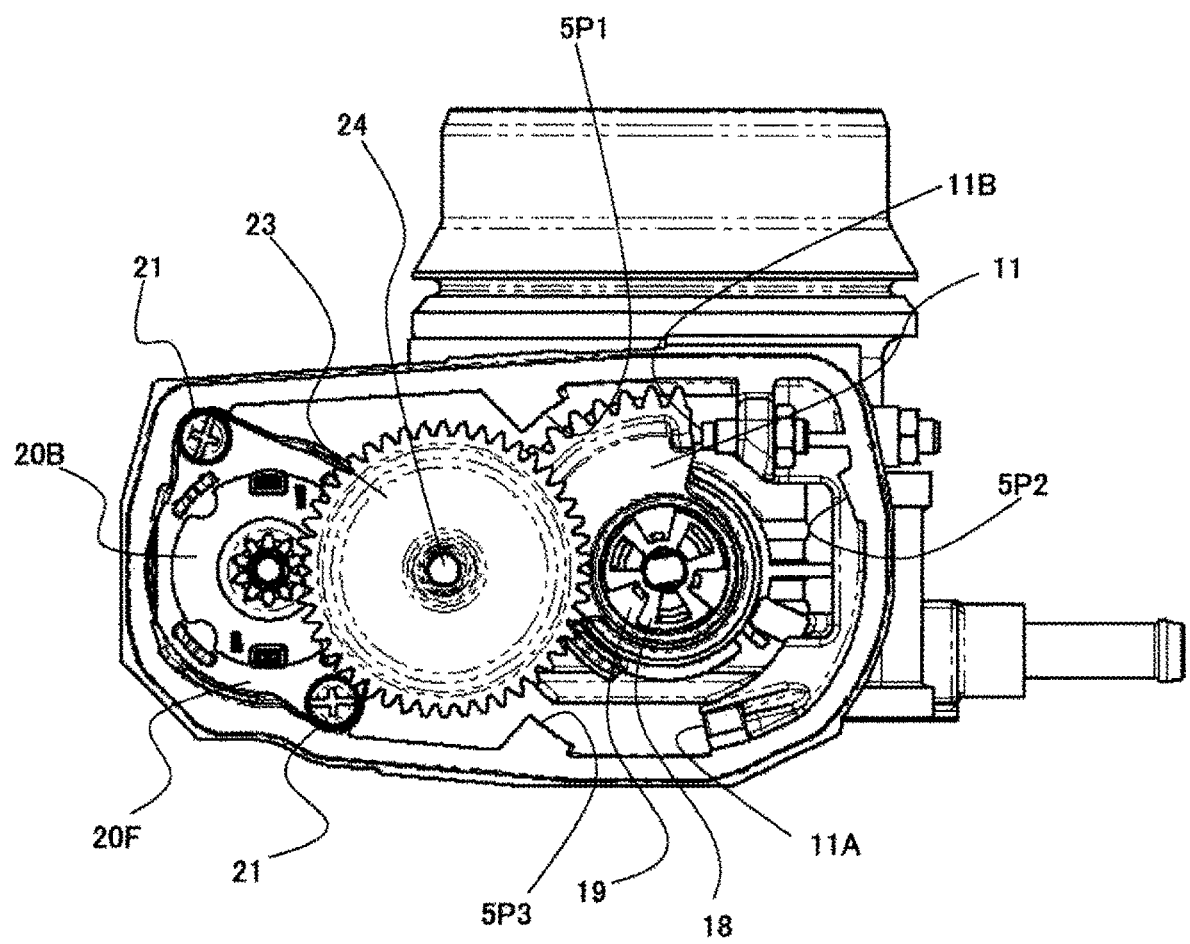
FIG. 6 is a plan view of the motor-driven throttle valve control device used for the gasoline engine vehicle from which a gear cover has been removed.

As illustrated in FIGS. 6 and 8, the motor housing 20A is formed substantially in parallel with the throttle shaft 3, the motor 20 configured using a brush DC motor is inserted into the motor housing 20A, and a flange portion of a bracket 20B of the motor 20 is fixed to a side wall of the throttle body 5 by screwing with a screw 21. As illustrated in FIG. 8, a wave washer 25 is disposed at an end of the motor 20 to hold the motor 20.

As illustrated in FIG. 8, openings of the bearing bosses 6 and 7 are sealed by the bearing 8 and a cap 10 to form a shaft seal portion, and are configured to maintain airtightness. In addition, the cap 10 on the bearing boss 7 side prevents an end of the throttle shaft 3 and the bearing 9 from being exposed. As a result, a leakage of air from the bearings 8 and 9 or a leakage of grease for lubricating the bearing into outside air or into a sensor chamber to be described later is prevented.

A metallic gear 22 having the smallest number of teeth is fixed to an end of the rotating shaft of the motor 20. A reduction gear mechanism and a spring mechanism, configured to rotatably drive the throttle shaft 3, are collectively disposed on a side portion of the throttle body on a side where the gear 22 is provided. These mechanical portions are covered with a cover (hereinafter referred to as a gear cover) 26 made of a resin material and fixed to the side portion of the throttle body 5.

As illustrated in FIG. 8, a throttle gear 11 is fixed to the end of the throttle shaft 3 on a side of the gear cover 26. The throttle gear 11 is constituted by a metal plate 12 and a gear portion 13 made of a resin material and molded on the metal plate 12 using resin. A cup-shaped concave portion is provided at a center portion of the metal plate 12, and a flange portion for gear molding is provided at an open-side end of the concave portion. The gear portion 13 made of the resin material is molded on this flange portion by resin molding.

The metal plate 12 has a hole at the center of the concave portion. A screw groove is engraved around a distal end of the throttle shaft 3. The distal end of the throttle shaft 3 is inserted into the hole of the concave portion of the metal plate 12, and the metal plate 12 is fixed to the throttle shaft 3 by screwing a nut 17 to a screw portion. Thus, the metal plate 12 and the gear portion 13 made of the resin material molded on the metal plate 12 rotate integrally with the throttle shaft 3.

A default spring 15 formed using a helical spring is sandwiched between a back face of the throttle gear 11 and the default lever 16. The return spring 14 formed using a helical spring is sandwiched between a back face of the default lever 16 and a side face of the throttle body 5. As these two springs are pulled in an opening direction and a closing direction, a default mechanism that regulates an opening degree of the throttle valve to a predetermined opening degree (hereinafter referred to as a default opening degree) when the energization of the motor is turned off.

Since the present embodiment relates to the gasoline throttle valve control device, an initial position of the throttle valve 2, that is, an opening degree position of the throttle valve 2 applied as the initial position when a power supply of the motor 20 is cut off is a default opening degree. Thus, a load in the closing direction toward the default opening degree is applied by the return spring 14 when the throttle valve 2 is opened more than the default opening degree, and a load in the opening direction toward the default opening degree is applied by the default spring 15 when the throttle valve 2 is closed more than the default opening degree.

An intermediate gear 23, rotatably supported by a gear shaft 24, made of a metal material and press-fitted and fixed to the side face of the throttle body 5, meshes between the gear 22 attached to the rotating shaft of the motor 20 and the throttle gear 11 fixed to the throttle shaft 3. The intermediate gear 23 is constituted by a large-diameter gear 23A meshing with the gear 22 and a small-diameter gear 23B meshing with the throttle gear 11. Both the gears are integrally molded by resin molding. These gears 22, 23A, 23B, and 11 constitute a two-stage reduction gear mechanism. Thus, the rotation of the motor 20 is transmitted to the throttle shaft 3 via this reduction gear mechanism.

Figure 7:
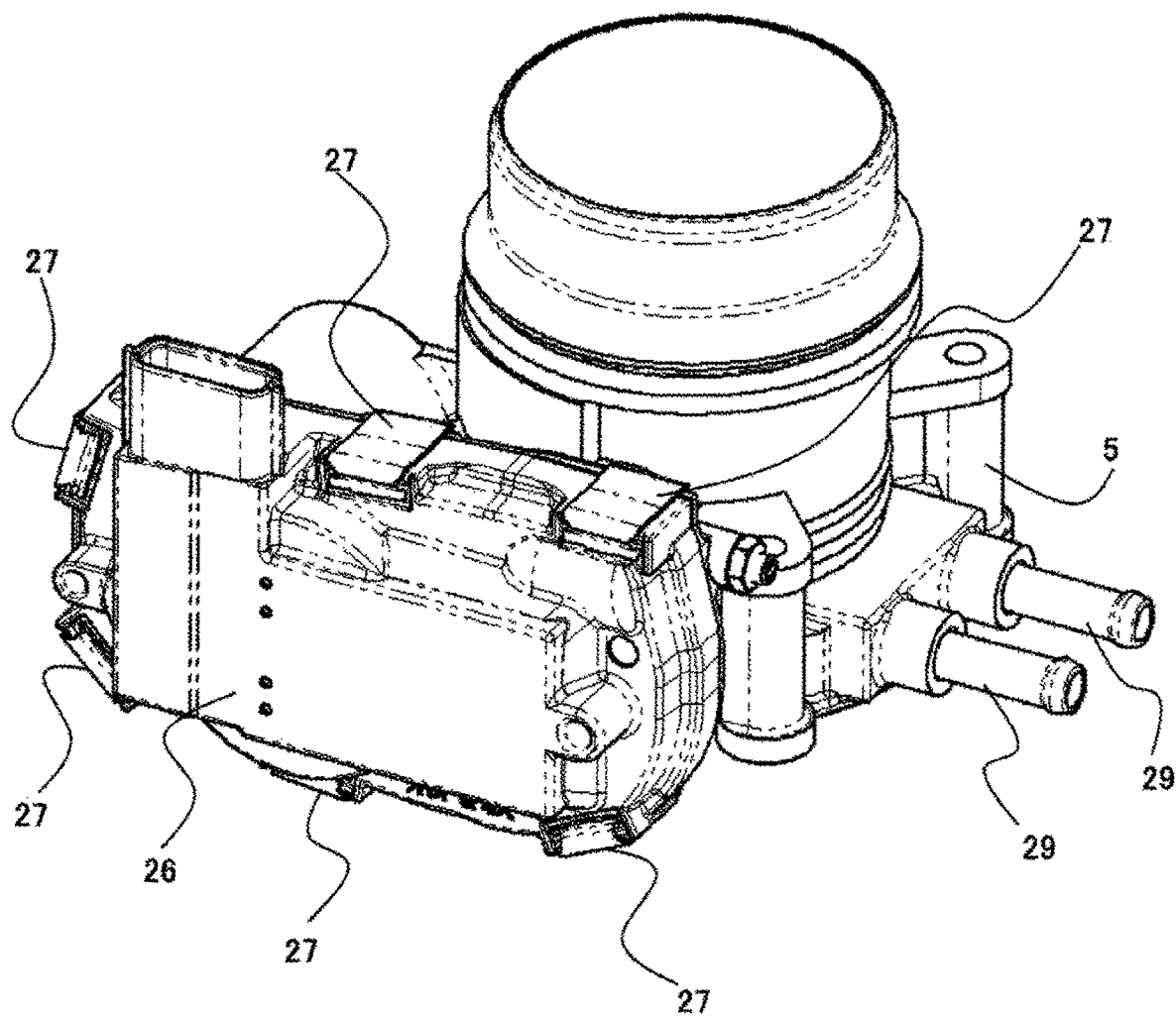
FIG. 7 is an external perspective view of the motor-driven throttle valve control device used for the gasoline engine vehicle.

These reduction gear mechanism and spring mechanism are covered with the gear cover 26 made of a resin material. A groove into which a seal member 31 is inserted is formed on an edge on an opening end side of the gear cover 26, and the seal member 31 is brought into close contact with an end face of a frame around a gear accommodating chamber formed on the side face of the throttle body 5 to shield the inside of the gear accommodating chamber from outside air when the gear cover 26 is put on the throttle body 5 in a state where the seal member 31 is mounted to this groove. As illustrated in FIG. 7, the gear cover 26 is fixed to the throttle body 5 with six clips 27 in this state.

A rotation angle detection device, that is, a throttle sensor formed between the reduction gear mechanism configured in this manner and the gear cover covering the reduction gear mechanism will be described in detail below.

As illustrated in FIG. 8, a resin holder 19 is integrally molded and fixed to the end of the throttle shaft 3 on the gear cover side. A conductor 18 formed by pressing is attached to a planar portion of a distal end of the resin holder 19 by integral molding. Therefore, when the motor 20 rotates and the throttle valve 2 rotates, the conductor 18 also rotates together.

A TPS substrate 28 is fixed to the gear cover 26 at a position opposing the conductor 18. An ASIC disposed on the TPS substrate detects an angle of a conductive pair 18 to detect the opening degree of the throttle valve 2 and supplies the detected result to an ECU as a sensor output.

Walls for positioning the gear cover 26 are indicated by 5P1 to 5P3 disposed in the throttle body 5, and the TPS substrate 28 and the conductor 18 on the rotation side are positioned as positioning protrusions of the gear cover 26 are locked to these three walls so that it is possible to output a signal within a required tolerance. A full-open stopper 11A mechanically determines a fully-open position of the throttle gear 11 and is configured using a protrusion integrally formed on a side wall of the throttle body.

It is difficult for the throttle shaft 3 to rotate beyond the fully-open position as a notched terminal end of the throttle gear 11 abuts on this protrusion.

The full-closed stopper 11B regulates a fully-closed position of the throttle shaft 3, and an opposite terminal end of the throttle gear 11 collides with the full-closed stopper 11B at the fully-closed position, and prevents the throttle shaft 3 from rotating beyond the fully-closed position.

As the coolant passage of the present invention is applied to the throttle valve control device formed in this manner, it is possible to obtain the compact throttle valve control device excellent in heat resistance. The groove 5T4 forming the coolant passage is close to the bearing 8 and has a function of cooling the bearing 8 by transmitting heat through the throttle body 5. In addition, the groove 5T3 is close to the bearing 9 and has a function of cooling the bearing 9 by transmitting heat through the throttle body 5. In addition, the grooves 5T1 to 5T4 annularly surround the bore 1 to make thermal deformation of the bore 1 uniform so that it is possible to reduce a risk that the throttle valve 2 and the bore 1 stick to each other.

According to the embodiment described above, the grooves 5T1, 5T2, 5T3, and 5T4 formed integrally with the throttle body 5 are disposed to be adjacent to circumferential walls of the bearing bosses 6 and 7 of the throttle body 5 serving as the members fixing the bearings 8 and 9 for axially supporting the throttle shaft 3. The coolant passages are formed by the grooves 5T1 to 5T4 and the plate 30. As a result, the heat transferred from the bearing via the bearing bosses 6 and 7 (or which is likely to be transferred to the bearing) can be carried away to the outside of the throttle body by the engine coolant.

Specifically, an outer wall 52 is integrally formed on at least a part of the outer side of an inner wall 51 of the intake passage 1 (the bore 1) through which intake air passes, the inlet pipe 29A for guiding the engine coolant to spaces (the grooves 5T1 to 5T4) formed between the inner wall 51 and the outer wall 52 and the outlet pipe 29B for discharging the engine coolant heated from the spaces (the grooves 5T1 to 5T4) communicate each other, and the spaces (the grooves 5T1 to 5T4) are integrally formed so as to be capable of transferring the heat around the pair of bearings 8 and 9 of the throttle shaft 3 extending through the intake passage 1 (the bore 1).

Thus, the bearing bosses 6 and 7 and the grooves 5T1, 5T2, 5T3, and 5T4 as the coolant passage can be formed integrally with the throttle body 5 by aluminum die casting, the manufacture is simple.

Specifically, the inlet pipe 29A and the outlet pipe 29B are positioned between the pair of bearings 8 and 9, and the passage cross-sectional areas of the spaces (the grooves 5T1 and 5T2) extending from the positions of the inlet pipe 29A and the outlet pipe 29B to the peripheries of the bearing bosses 6 and 7 is formed to be larger than the passage cross-sectional areas of the spaces of the portions (the grooves 5T3 and 5T4) close to the bearing bosses 6 and 7. As a result, the passage cross-sectional shapes of the spaces (the grooves 5T1 and 5T2) from the positions of the inlet pipe 29A and the outlet pipe 29B to the peripheries of the bearing bosses 6 and 7 are the passage cross-sectional shapes which are different from the passage cross-sectional shapes of the spaces (the grooves 5T3 and 5T4) of the portions close to the bearing bosses 6 and 7. Due to the aluminum die-cast, the passage cross-sectional area of the groove can be molded into an appropriate passage cross-sectional shape depending on the part.

More specifically, the space is formed in the attachment end face of the throttle body 5 with respect to the intercooler as the arcuate grooves 5T1, 5T2, 5T3, and 5T4 which are released in the flowing direction of air. Thus, the die-cut is easy, and a die-casting mold has a simple shape. In addition, when defining the coolant passage, it is possible to form the passage simply by plugging the open end with the plate.

More preferably, the arcuate grooves 5T1, 5T2, 5T3, and 5T4 are formed as annular grooves each of which turns full circle around the intake passage. As a result, the flow of the coolant becomes smooth so that there is no stagnation from the inlet to the outlet and the cooling performance is stably obtained.

More preferably, the inlet pipe 29A and the outlet pipe 29B are adjacent to each other with the partition wall 5W partitioning the annular groove sandwiched therebetween. As a result, an outer shell space factor is not impaired since it is possible to provide the two pipes close to each other as well as it is possible to obtain the sufficient cooling performance since there is no flow with short circuit from the inlet pipe 29A side to the outlet pipe 29B.

More preferably, the inlet pipe 29A is provided on the side of the cover 26 of the throttle body 5, and the outlet pipe 29B is positioned on the side opposite to the cover 26. As a result, not only the motor is fixed but also it is possible to cool a portion where the temperature becomes high or a portion whose passage shape is a shape that hardly absorbs heat while a heat absorption effect of the coolant is high by cooling the periphery of the bearing boss on a side where the passage cross-sectional area is small first, so that it is possible to obtain the efficient and uniform cooling performance.

More preferably, the space around the bearing on the side of the cover of the throttle body is formed to be shallow in the flowing direction of the intake air, and as a result, a space for disposing a spring is secured between the space and an outer circumference of the bearing. As a result, it is possible to accommodate functional parts as the electronic control throttle body compactly in a narrow space so that it is possible to suppress an increase in size of the outer shell although the coolant passage is provided, and a temperature of the spring can constantly be kept at a coolant temperature so that it is possible to suppress variations in spring characteristics caused by a change in outside air temperature and to improve valve opening characteristics of the throttle valve. In addition, since the load of the spring does not change with temperature, an output torque of the motor is stabilized and a rating of the motor can be made small so that it is possible to make a contribution to miniaturization in this respect as well.

Further, groove dimensions (groove depths) in the direction along the flow of intake air in the coolant passages 5T1 to 5T4 are formed to have depths that surrounds the periphery of the throttle valve 2 when the throttle valve 2 is at the fully-closed position. Thus, it is possible to suppress freezing occurring on an inner wall of the intake passage around the throttle valve and to suppress burned products and tar in an exhaust gas recirculated to the intake passage at the upstream or downstream of the throttle valve by the EGR, and unburned products in an unburned gas due to returning from sticking to the inner wall of the intake passage and being solidified by freezing.

Although the motor-driven throttle valve control device (motor driven throttle valve control device) for the gasoline engine vehicle to which the coolant passage is mounted has been described in the embodiment, the invention can be also applied to a motor-driven throttle valve control device for a diesel engine vehicle. In addition, the invention can also be applied to a mechanical throttle valve control device for an engine. Further, the invention can also be applied to a throttle valve control device for EGR gas control and a throttle valve control device for negative pressure generation.

REFERENCE SIGNS LIST

1 bore
2 electronic control throttle valve
3 throttle shaft
4 screw
5 throttle body
5F1 plate attachment portion
5F2 plate attachment portion
5T1 groove
5T2 groove
5T3 groove
5T4 groove
5P1 wall
5P2 wall
5P3 wall
5W wall portion
6 bearing boss
7 bearing boss
8 bearing
9 bearing
10 cap
11 throttle gear
11B fully-closed stopper
12 metal plate
13 gear made of resin material
14 return spring
15 default spring
16 default lever
17 nut
18 conductor
19 resin holder
20 motor
20A motor housing
20B bracket 21 screw
22 gear
23 intermediate gear
23A large-diameter gear
23B small-diameter gear
24 gear shaft
25 wave washer
26 gear cover
27 clip
28 TPS substrate
29A inlet-side coolant pipe
29B outlet-side coolant pipe
30 plate
31 seal member

The invention claimed is:

1. An electronic control throttle body comprising:
a passage forming body that forms an intake air passage through which intake air flows;
a pair of bearing fixing portions that fixes a pair of bearings configured to rotatably support a throttle shaft disposed across the intake air passage;
a flow path forming body that surrounds the intake air passage and forms a flow path through which a heat-exchange medium flows; and
an accommodating portion that is provided so as to surround the bearing fixing portion of one of the pair of bearings and forms an accommodation space that is connected to a space where an electric element relating to driving of the throttle shaft is accommodated,
wherein the flow path is constituted by a first flow path closer to the one bearing fixing portion positioned on a side of the accommodation space between the pair of bearing fixing portions, and a second flow path closer to the other bearing fixing portion positioned on an opposite side of the accommodation space between the pair of bearing fixing portions, and
the second flow path is formed at a position closer to the bearing fixing portion than the first flow path, wherein a flow path cross-sectional area of the first flow path is smaller than a flow path cross-sectional area of the second flow path.

2. A valve device comprising:
a passage member in which a fluid passage is formed;
a shaft which is rotatably supported by a bearing fixed to the passage member; and
a valve which is fixed to the shaft and controls a passage cross-sectional area of the fluid passage by rotation of the shaft, wherein
the passage member is integrally formed with a refrigerant passage,
the valve is a throttle valve, the fluid passage is an intake passage, and the cooling medium is an engine coolant,
the shaft extends across the intake passage,
the bearing rotatably supporting the shaft is formed of a pair of bearings facing each other with the intake passage sandwiched therebetween,
the refrigerant passage surrounds an outer side of a wall surface forming the intake passage and is formed as an annular passage that is formed between the intake passage and an outer wall integrally formed with the passage member, and
inlet and outlet portions of an engine coolant are formed in the refrigerant passage connecting the pair of bearings.

3. The valve device according to claim 2, wherein the valve is an EGR valve, the fluid passage is an exhaust gas passage, and a cooling medium is an engine coolant.

4. The valve device according to claim 2, wherein a partition wall dividing the annular passage is provided between the inlet and outlet portions of the engine coolant.

5. The valve device according to claim 2, wherein the annular passage is formed at an attachment end face of the passage member as an arcuate groove which is released in a flowing direction of air.

6. A motor-driven throttle body formed with an intake passage whose passage cross-sectional area is controlled by rotation of a throttle valve driven by a motor, the throttle body comprising:
a pair of bearing fixing portions to which a pair of bearings axially supporting a throttle shaft to which the throttle valve is fixed;
an accommodating portion in which functional parts, configured to drive the throttle valve including at least the motor and a spring that biases the throttle valve in a rotational direction, are accommodated so as to surround one bearing fixing portion between the pair of bearing fixing portions; and
a cover attached to the throttle body so as to cover the functional parts, wherein
an engine coolant passage, which guides an engine coolant, is formed integrally with the throttle body to be adjacent to walls of the bearing fixing portions,
the bearing and the engine coolant are configured to be capable of transferring heat through the walls of the bearing fixing portions, and
a cross-sectional area of the engine coolant passage close to the bearing fixing portion on a side opposite to the accommodating portion is configured to be larger than a cross-sectional area of the engine coolant passage close to the bearing fixing portion on a side of the accommodating portion.

7. The motor-driven throttle body according to claim 6, wherein
the spring among the functional parts is disposed between an outer circumference of the one bearing fixing portion and a wall of the engine coolant passage close to the one bearing fixing portion.

8. The motor-driven throttle body according to claim 6, wherein
an outer circumference of the other bearing fixing portion and a wall of the engine coolant passage close to the other bearing fixing portion are formed by a common wall.

9. The motor-driven throttle body according to claim 6, wherein
the engine coolant passage close to the bearing fixing portion on a side opposite to the accommodating portion is formed to be closer to the bearing fixing portion than the engine coolant passage close to the bearing fixing portion on a side of the accommodating portion.

10. The motor-driven throttle body according to claim 6, wherein
the refrigerant passage connecting the pair of bearings is formed as an annular passage that surrounds a periphery of the intake passage, and
inlet and outlet portions of the engine coolant are formed in the annular passage.

11. The motor-driven throttle body according to claim 10, wherein a partition wall dividing the annular passage is provided between the inlet and outlet portions of the engine coolant.

12. The motor-driven throttle body according to claim 6, wherein the annular passage is formed at an attachment end face of the passage member as an arcuate groove which is released in a flowing direction of air.

13. A motor-driven throttle body, which is installed upstream of an intercooler and formed with an intake passage whose passage cross-sectional area is controlled by rotation of a throttle valve driven by a motor, the throttle body comprising:

a pair of bearing fixing portions to which a pair of bearings axially supporting a throttle shaft to which the throttle valve is fixed;

an accommodating portion in which functional parts, configured to drive the throttle valve including at least the motor and a spring that biases the throttle valve in a rotational direction, are accommodated so as to surround one bearing fixing portion between the pair of bearing fixing portions; and a cover attached to the throttle body so as to cover the functional parts, wherein an engine coolant passage, which guides an engine coolant, is formed integrally with the throttle body to be adjacent to walls of the bearing fixing portions, the bearing and the engine coolant are configured to be capable of transferring heat through the walls of the bearing fixing portions, the engine coolant passage is formed as an annular passage which surrounds an outer side of a wall surface forming the intake passage and is formed between an outer wall integrally formed with a passage member and the wall surface, an inlet pipe for guiding the engine coolant and an outlet pipe for discharging the engine coolant heated from a space are connected to the engine coolant passage, and the inlet pipe is provided on a side closer to the bearing fixing portion on a side of the accommodating portion and the outlet pipe is provided on a side closer to the bearing fixing portion on a side opposite to the accommodating portion.

14. The motor-driven throttle body according to claim 13, wherein the annular passage is formed in an attachment end face of the passage member on a side connected to the intercooler as an arcuate groove which is released in a flowing direction of air, and a depth of the annular groove in a direction along the intake passage is formed up to a position including at least an upstream end of the intake passage of the throttle valve when the throttle valve is positioned at a position of a full-closed opening degree.

* * * * *